(12) United States Patent
Gitzel et al.

(10) Patent No.: US 12,166,335 B2
(45) Date of Patent: Dec. 10, 2024

(54) APPARATUS FOR MONITORING A SWITCHGEAR

(71) Applicant: ABB Schweiz AG, Baden (CH)

(72) Inventors: Ralf Gitzel, Mannheim (DE); Subanatarajan Subbiah, Neulussheim (DE); Benedikt Schmidt, Heidelberg (DE)

(73) Assignee: ABB Schweiz AG, Baden (CH)

( * ) Notice: Subject to any disclaimer, the term of this patent is extended or adjusted under 35 U.S.C. 154(b) by 562 days.

(21) Appl. No.: 17/467,295

(22) Filed: Sep. 6, 2021

(65) Prior Publication Data

US 2021/0396584 A1   Dec. 23, 2021

Related U.S. Application Data

(63) Continuation of application No. PCT/EP2020/055473, filed on Mar. 2, 2020.

(30) Foreign Application Priority Data

Mar. 7, 2019   (EP) .................................. 19161435

(51) Int. Cl.
*H02B 3/00*   (2006.01)
*G01J 5/00*   (2022.01)
(Continued)

(52) U.S. Cl.
CPC .............. *H02B 3/00* (2013.01); *G01J 5/0066* (2013.01); *G01J 5/0096* (2013.01); *G06N 3/08* (2013.01);
(Continued)

(58) Field of Classification Search
CPC ........ H02B 3/00; G01J 5/0066; G01J 5/0096; G01J 2005/0077; G06N 3/08;
(Continued)

(56) References Cited

U.S. PATENT DOCUMENTS 10,664,963 B1 *   5/2020   Rossi ..................... G06V 10/82
11,106,903 B1 *   8/2021   Huynh ................... G06V 10/82
(Continued)

FOREIGN PATENT DOCUMENTS

CN   102891443 A   1/2013
CN   103824092 A   5/2014
(Continued)

OTHER PUBLICATIONS

Kniaz et al., "Thermal Texture Generation and 3D Model Reconstruction Using SfM And GAN," *International Archives of the Photogrammetry, Remote Sensing & Spatial Information Sciences (ISPRS Archives)*, 42(2): 519-524 (May 30, 2018).
(Continued)

*Primary Examiner* — Nathaniel T Woodward
*Assistant Examiner* — Philip L Cotey
(74) *Attorney, Agent, or Firm* — Leydig, Voit & Mayer, Ltd.

(57) ABSTRACT

An apparatus for monitoring a switchgear includes: an input unit; a processing unit; and an output unit. The input unit provides the processing unit with a monitor infra-red image of a switchgear. The processing unit implements a machine learning classifier algorithm to analyse the monitor infra-red image and determine if there is one or more anomalous hot spots in the switchgear. The machine learning classifier algorithm has been trained based on a plurality of different training infra-red images, the plurality of training infra-red images including a plurality of synthetic infra-red images generated from a corresponding plurality of visible images. The output unit outputs information relating to the one or more anomalous hot spots.

17 Claims, 3 Drawing Sheets

(51) Int. Cl.
| | |
|---|---|
| *G06N 3/08* | (2023.01) |
| *G06N 20/00* | (2019.01) |
| *G06T 7/13* | (2017.01) |
| *G06V 10/764* | (2022.01) |
| *G06V 10/774* | (2022.01) |
| *G06V 20/00* | (2022.01) |
| *G06N 3/045* | (2023.01) |

(52) U.S. Cl.
CPC ............. *G06N 20/00* (2019.01); *G06T 7/13* (2017.01); *G06V 10/764* (2022.01); *G06V 10/774* (2022.01); *G06V 20/00* (2022.01); *G01J 2005/0077* (2013.01); *G06N 3/045* (2023.01); *G06T 2207/10048* (2013.01)

(58) Field of Classification Search
CPC .......... G06N 20/00; G06N 3/045; G06T 7/13; G06T 2207/10048; G06V 10/764; G06V 10/774; G06V 20/00
See application file for complete search history.

(56) References Cited

U.S. PATENT DOCUMENTS

| | | | | |
|---|---|---|---|---|
| 2015/0296146 | A1* | 10/2015 | Scanlon | H04N 23/90 |
| | | | | 348/82 |
| 2016/0035093 | A1* | 2/2016 | Kateb | G02B 21/0012 |
| | | | | 382/131 |
| 2017/0068614 | A1* | 3/2017 | Jayaraman | G06F 11/3684 |
| 2018/0307947 | A1* | 10/2018 | Choi | G06F 18/22 |
| 2019/0025773 | A1* | 1/2019 | Yang | G06N 3/084 |
| 2019/0310137 | A1* | 10/2019 | Pop | G06F 1/305 |
| 2020/0007824 | A1* | 1/2020 | Henry | H04N 23/23 |
| 2020/0104567 | A1* | 4/2020 | Tajbakhsh | G06V 40/165 |
| 2020/0314359 | A1* | 10/2020 | Henry | H04L 67/125 |
| 2021/0133510 | A1* | 5/2021 | Boulanger | G06F 18/241 |
| 2021/0150267 | A1* | 5/2021 | Boulanger | G06F 18/214 |
| 2021/0264615 | A1* | 8/2021 | Whittam | G06T 7/11 |
| 2021/0397837 | A1* | 12/2021 | Subbiah | G06V 20/10 |
| 2022/0011164 | A1* | 1/2022 | Wildermuth | G06T 7/136 |
| 2022/0357207 | A1* | 11/2022 | Pop | G06F 1/305 |

FOREIGN PATENT DOCUMENTS

| | | |
|---|---|---|
| CN | 203984091 U | 12/2014 |
| CN | 106060364 A | 10/2016 |
| CN | 107607207 A | 1/2018 |
| CN | 107680195 A | 2/2018 |
| CN | 109101906 A | 12/2018 |
| EP | 0342597 A2 | 11/1989 |
| JP | 2009-301494 A | 12/2009 |
| KR | 10-1421591 B1 | 8/2014 |
| WO | WO 2019/002205 A1 | 1/2019 |
| WO | WO 2019/002507 A1 | 1/2019 |

OTHER PUBLICATIONS

Wang et al., "SmartGuard: An Autonomous Robotic System for Inspecting Substation Equipment," *J. of Field Robotics*, 29(1): 123-137 (Jan. 2012).

Zhang et al., "TV-GAN: Generative Adversarial Network Based Thermal to Visible Face Recognition," *2018 International Conference on Biometrics (ICB)*, IEEE, 174-181 (Feb. 20, 2018).

European Patent Office, Extended European Search Report in European Patent Application No. 19161435.3, 8 pp. (Sep. 10, 2019).

European Patent Office, International Preliminary Report on Patentability in International Patent Application No. PCT/EP2020/055473, 8 pp. (Aug. 25, 2021).

European Patent Office, International Search Report in International Patent Application No. PCT/EP2020/055473, 4 pp. (Mar. 26, 2020).

European Patent Office, Written Opinion in International Patent Application No. PCT/EP2020/055473, 7 pp. (Mar. 26, 2020).

The Patent Office of the People's Republic of China, Office Action in Chinese Patent Application No. 202080019194.3, 17 pp. (Mar. 7, 2024).

* cited by examiner

APPARATUS FOR MONITORING A SWITCHGEAR

CROSS-REFERENCE TO PRIOR APPLICATION

This application is a continuation of International Patent Application No. PCT/EP2020/055473, filed on Mar. 2, 2020, which claims priority to European Patent Application No. EP 19161435.3, filed on Mar. 7, 2019. The entire disclosure of both applications is hereby incorporated by reference herein.

FIELD

The present invention relates to an apparatus and system for monitoring a switchgear.

BACKGROUND

Switchgear failures due to hot spots of high temperatures can have dramatic consequences, for example electric arcs/flash overs that can act almost like explosions. A method and associated system for monitoring and early warning before such incidents develop is highly needed and currently not available in an affordable form, which could be installed as a standard in every switchgear and give enough information on the switchgear health state. Also, no method or system is available where images of a switchgear are acquired and transmitted for processing elsewhere in order to provide such monitoring and early warning. At the moment, using IR sensors to detect hot spots in circuit breakers, switchgear, and other electrical equipment requires a lot of very precise calibration to measure the temperature at exactly the right position. There is also an associated problem of identifying the right region in the IR image to monitor. A common solution for all switchgear and all circuit breakers within such switchgear is not possible because of different types and geometry.

There is a need to address these issues.

SUMMARY

In an embodiment, the present invention provides an apparatus for monitoring a switchgear, the apparatus comprising: an input unit; a processing unit; and an output unit, wherein the input unit is configured to provide the processing unit with a monitor infra-red image of a switchgear, wherein the processing unit is configured to implement a machine learning classifier algorithm to analyse the monitor infra-red image and determine if there is one or more anomalous hot spots in the switchgear, wherein the machine learning classifier algorithm has been trained based on a plurality of different training infra-red images, the plurality of training infra-red images comprising a plurality of synthetic infra-red images generated from a corresponding plurality of visible images, and wherein the output unit is configured to output information relating to the one or more anomalous hot spots.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
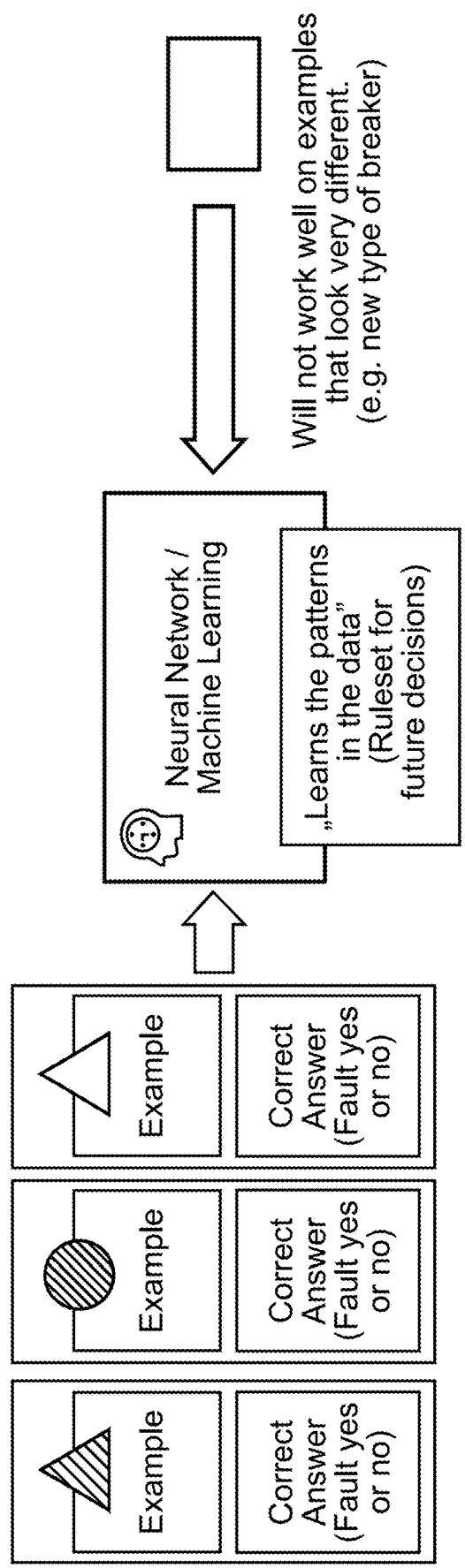
FIG. 1 shows a schematic example relating to a machine learning training process.

In an embodiment, the present invention provides an improved ability to monitor a switchgear.

In a first aspect, there is provided an apparatus for monitoring a switchgear, the apparatus comprising:

an input unit;
a processing unit; and
an output unit.

The input unit is configured to provide the processing unit with a monitor infra-red image of a switchgear. The processing unit is configured to implement a machine learning classifier algorithm to analyse the monitor infra-red image and determine if there is one or more anomalous hot spots in the switchgear. The machine learning classifier algorithm has been trained on the basis of a plurality of different training infra-red images. The plurality of training infra-red images comprises a plurality of synthetic infra-red images generated from a corresponding plurality of visible images. The output unit is configured to output information relating to the one or more anomalous hot spots.

In this manner, the apparatus can determine if there are hot spots in switchgear and other electrical components more accurately, because a large training set can be conveniently generated based on visible imagery and where some of that imagery can be manipulated in order to provide a training data set that exhibits a greater portion indicating problems, and in this way this improves the ability to determine if there are hot spots over a wider range of situations for different switchgears and without human intervention.

In an example, generation of the plurality of synthetic images comprises utilisation of an image processing algorithm.

In an example, generation of the plurality of synthetic images comprises utilisation of a trained image processing algorithm.

In an example, the trained image processing algorithm is a trained style transfer algorithm.

In an example, generation of one or more synthetic infra-red images of the plurality of synthetic infra-red images comprises an addition of at least one hot spot to the one or more synthetic infra-red images.

In an example, generation of two or more synthetic infra-red images of the plurality of synthetic infra-red images comprises an addition of at least one hot spot to the two or more synthetic infra-red images.

In an example, addition of the at least one hot spot for at least one synthetic infra-red image is carried out manually.

In an example, addition of the at least one hot spot for at least one synthetic infra-red image is carried out automatically.

In an example, addition of the at least one hot spot comprises utilisation of an edge detection algorithm.

In an example, generation of plurality of synthetic infra-red images comprises utilization of a hue algorithm.

In an example, generation of plurality of synthetic infra-red images comprises utilization of a flood fill algorithm.

In an example, the plurality of visible images comprises image data of a switchgear.

In an example, the plurality of visible images comprises image data of at least one circuit breaker.

In an example, the monitor infra-red image comprises image data of at least one circuit breaker.

In an example, the machine learning classifier algorithm is a neural network.

In an example, the neural network is a convolutional neural network.

In an example, the processing unit is configured to update the training of the machine learning classifier algorithm comprising utilisation of the monitor infra-red image.

In an example, the training update comprises a manual indication that the monitor infra-red image comprises no anomalous hot spots or a manual indication that the monitor infra-red image comprises one or more anomalous hot spots.

In an example, the manual indication that the monitor infra-red image comprises one or more anomalous hot spots comprises a manual indication of one or more locations in the monitor infra-red image of the one or more anomalous hot spots.

In a second aspect, there is provided a system for monitoring a switchgear, the system comprising:
an infra-red camera; and
an apparatus for monitoring a switchgear according to the first aspect.

The infra-red camera is configured to acquire the monitor infra-red image of the switchgear.

The above aspects and examples will become apparent from and be elucidated with reference to the embodiments described hereinafter.

The apparatus and system enables hot spots in switchgear, for example in circuit breakers, and in other electrical equipment to be detected through identifying hot spots in infra-red imagery of this equipment. This is achieved through utilization of a machine learning algorithm that has been trained on infra-red imagery, at least some of which is synthetically generated in order that the training set can be significant enough for the machine learning algorithm to be able to identify hot spots in different equipment types, from different vantage points and in different situations. The synthetically generated infra-red imagery has been generated from visible imagery, and because there can be limited available real data relating to anomalous hot spots in equipment, hot spots have been added to the imagery as part of the process of transforming some of the visible imagery into corresponding infra-red imagery.

Thus this is achieved by apparatus that comprises an input unit, a processing unit, and an output unit. The input unit is configured to provide the processing unit with a monitor infra-red image of a switchgear. The processing unit is configured to implement a machine learning classifier algorithm to analyse the monitor infra-red image and determine if there is one or more anomalous hot spots in the switchgear. The machine learning classifier algorithm has been trained on the basis of a plurality of different training infra-red images. The plurality of training infra-red images comprises a plurality of synthetic infra-red images generated from a corresponding plurality of visible images. The output unit is configured to output information relating to the one or more anomalous hot spots.

According to an example, generation of the plurality of synthetic images comprises utilisation of an image processing algorithm.

According to an example, generation of the plurality of synthetic images comprises utilisation of a trained image processing algorithm.

According to an example, the trained image processing algorithm is a trained style transfer algorithm.

According to an example, generation of one or more synthetic infra-red images of the plurality of synthetic infra-red images comprises an addition of at least one hot spot to the one or more synthetic infra-red images.

According to an example, generation of two or more synthetic infra-red images of the plurality of synthetic infra-red images comprises an addition of at least one hot spot to the two or more synthetic infra-red images.

According to an example, addition of the at least one hot spot for at least one synthetic infra-red image is carried out manually.

According to an example, addition of the at least one hot spot for at least one synthetic infra-red image is carried out automatically.

According to an example, addition of the at least one hot spot comprises utilisation of an edge detection algorithm.

According to an example, generation of plurality of synthetic infra-red images comprises utilization of a hue algorithm.

According to an example, generation of plurality of synthetic infra-red images comprises utilization of a flood fill algorithm.

According to an example, the plurality of visible images comprises image data of a switchgear.

According to an example, the plurality of visible images comprises image data of at least one circuit breaker.

According to an example, the monitor infra-red image comprises image data of at least one circuit breaker.

According to an example, the machine learning classifier algorithm is a neural network.

According to an example, the neural network is a convolutional neural network.

According to an example, the processing unit is configured to update the training of the machine learning classifier algorithm comprising utilisation of the monitor infra-red image.

According to an example, the training update comprises a manual indication that the monitor infra-red image comprises no anomalous hot spots or a manual indication that the monitor infra-red image comprises one or more anomalous hot spots.

According to an example, the manual indication that the monitor infra-red image comprises one or more anomalous hot spots comprises a manual indication of one or more locations in the monitor infra-red image of the one or more anomalous hot spots.

As discussed above, the apparatus can be part of a system that has a camera that acquires the monitor infra-red image and provides this to the processing unit, via the input unit.

Thus, the described apparatus and system provides a way to analyze the an infra-red image as a whole without defining regions of interest. It specifically takes into account the fact that there are different circuit breaker geometries. For this purpose a machine learning algorithm (e.g. a convolutional neural network) is used. The network is trained with infra-red training imagery at least some of which has been produced from visible imagery, and some of that synthetic imagery has had one or more hot spots added to it. As a result, the expensive human intervention of either calibration or region definition is eliminated from the process.

The apparatus and system are explained in more detail with reference to a circuit breaker in a switchgear, but this is just one example and the apparatus and system find utility to other parts of switchgear and many other types of electrical equipment, where hot spots can occur and be problematic.

Thus it is convenient to set the scene. There is currently a strong interest in using infra-red data to assess a circuit breaker's health state, where hot spots are indicative of a problem and these hotspots are easy for a human to identify and interpret. However, using skilled technicians and engineers in this manner is very expensive. Machine learning algorithms are here utilised to achieve this without a human. However, machine learning algorithms require an extensive training dataset of relevant data, and this is difficult and expensive to provide. The apparatus and system described here addresses this situation.

Continuing with the situation prior to development of the day described apparatus and system, some existing solutions require a very precise calibration of the sensor to look at the right spot. This means that engineering cost is high. A solution that covers a larger area still requires a human to identify the right regions to look at.

Regarding any generic solution that does not require identification of the right areas (e.g. based on a convolutional neural network), this needs to be robust against the differences in circuit breaker geometry and function to be useful. However, if the training network has never experienced certain situations, it is less likely to classify them correctly. This situation can be referred to as overfitting, and results from the process of training a classifier neural network as shown in FIG. 1. Basically, the classifier neural network learns to recognize patterns, which are anticipated to apply to example situations encountered later. However, if the example is very different from the original training examples, there is a risk that the neural network will not work, because certain unique properties of the original data have become part of the patterns.

Overfitting can be avoided by providing a wide range of training data. Ideally, the training data includes examples of every type of input, which will be encountered in the future. However, IR images of circuit breakers, especially in a faulty state, are not readily available and expensive to produce.

Thus, the surprising solution utilised in the apparatus and system described here involves turning visible-light photos into infra-red images using for example a technique known as style transfer. Style transfer has been used to transforming a photograph into a "painting", where a working principle is to provide a training set of photographs and corresponding paintings.

Figure 2:
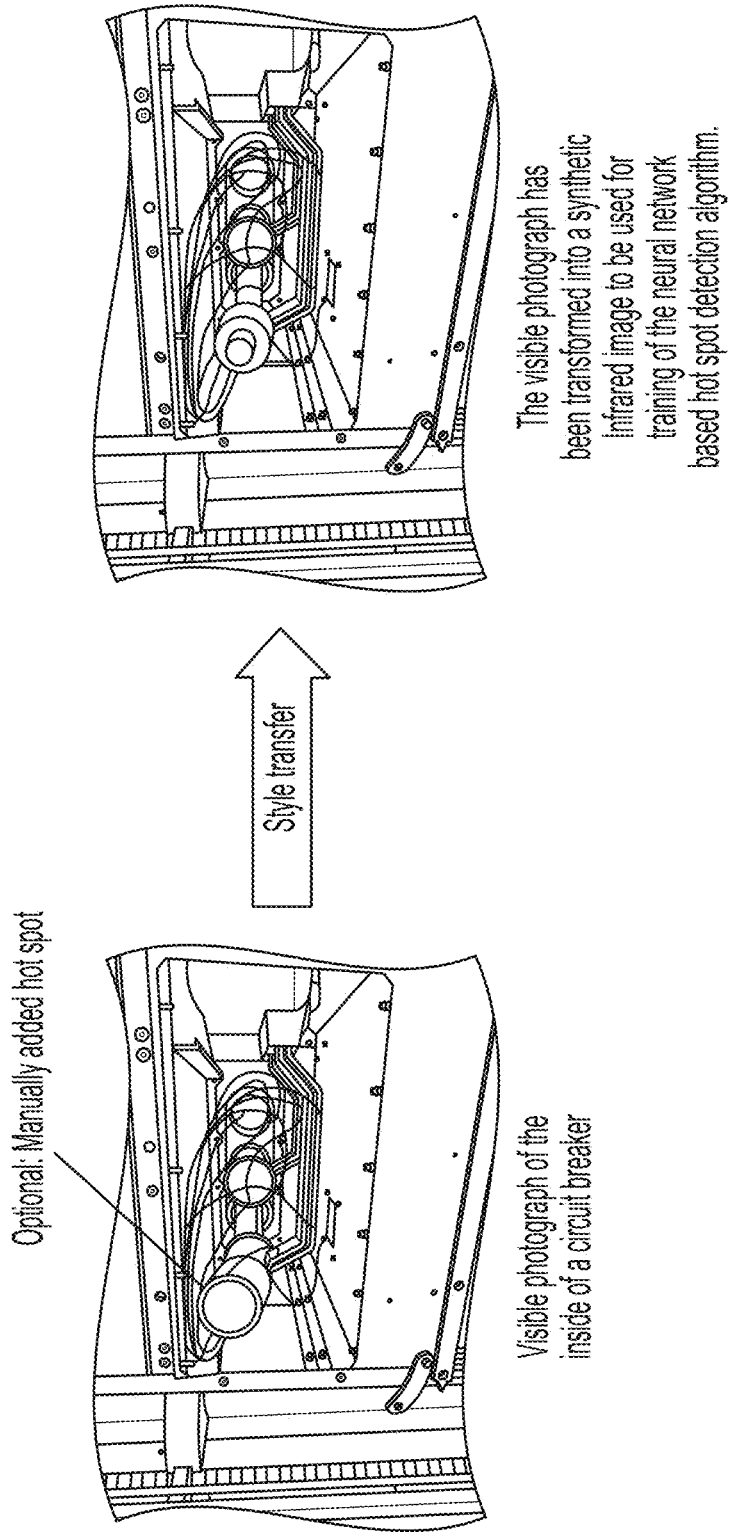
FIG. 2 shows an example of transforming a visible image of the inside of a circuit breaker into a corresponding infra-red image.
Figure 3:
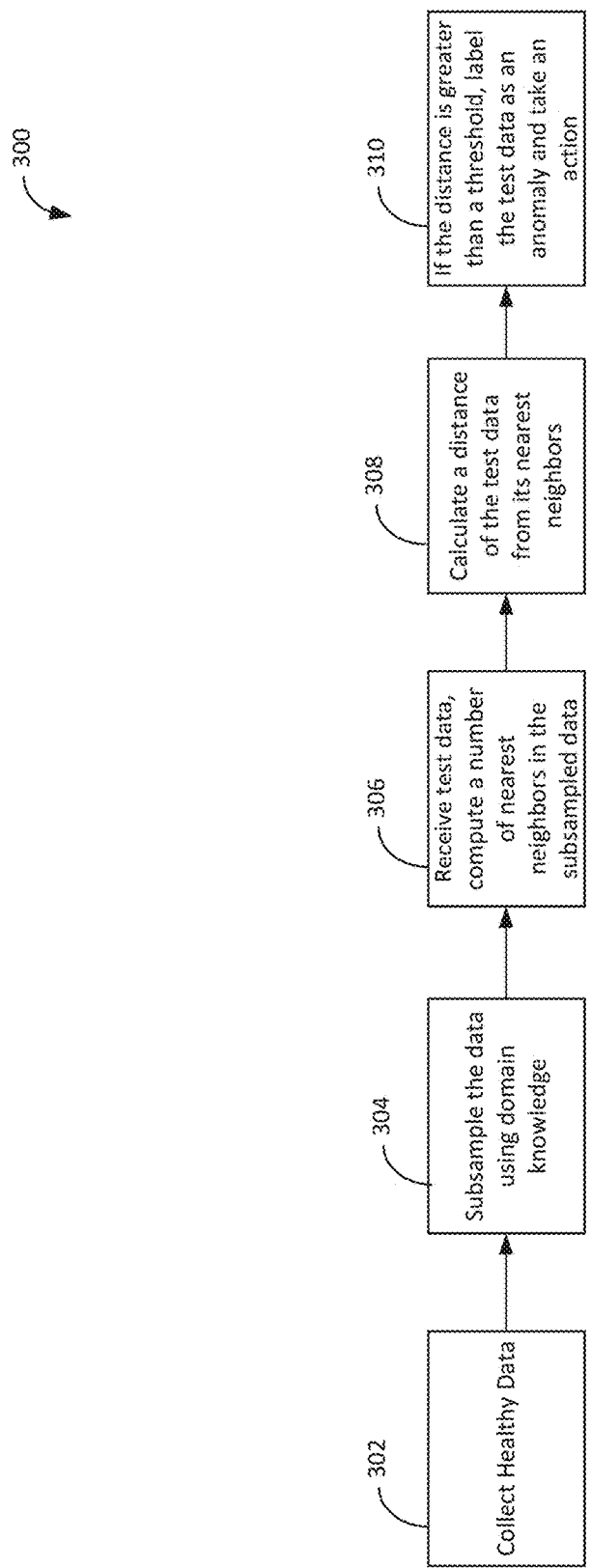
FIG. 3 shows an example of an input unit, processing unit, and output unit.

However, now for the described apparatus and system the target "style" is an image that shares many properties of an infra-red image, and again is a visible light image. Most areas are close to ambient temperature but show some contours simulating reflected infra-red radiation (see FIG. 2). During the transformation process or afterwards, a hot spot is added to some of the images to simulate damage occurring in the circuit breaker.

Thus, the trained style transfer model is used to turn photographs of circuit breaker interiors into synthetic or fake infra-red images. For a circuit breaker type which is to be added to the training set of the classifier neural network the following is done: photographs of the circuit breaker interior are taken, with slight variations in angle and position. The style transfer process, or a similar transformation process, is then used to generate both healthy (no hot spot) and faulty (hot spot) images. These are automatically labeled and added to the training set. The hot spots can be added, based on a marker provided by an expert, or based on edge recognition. Hot spots can be added to the synthetic infra-red image with classical image processing algorithms (hue, flood fill etc.). Also, real infra-red images can be used for the initial training along with synthetic infra-red images.

The input unit 302 is configured to provide the processing unit 304 with a monitor infra-red image of a switchgear. The processing unit 304 is configured to implement a machine learning classifier algorithm to analyse the monitor infra-red image and determine if there is one or more anomalous hot spots in the switchgear. The machine learning classifier algorithm has been trained on the basis of a plurality of different training infra-red images. The plurality of training infra-red images comprises a plurality of synthetic infra-red images generated from a corresponding plurality of visible images. The output unit 306 is configured to output information relating to the one or more anomalous hot spots.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An apparatus for monitoring a switchgear, the apparatus comprising:
   an input unit;
   a processing unit; and
   an output unit,
   wherein the input unit is configured to provide the processing unit with a monitor infra-red image of a switchgear,
   wherein the processing unit is configured to implement a machine learning classifier algorithm to analyse the monitor infra-red image and determine if there is one or more anomalous hot spots in the switchgear,
   wherein the machine learning classifier algorithm has been trained based on a plurality of different training infra-red images, the plurality of training infra-red images comprising a plurality of synthetic infra-red images generated from a corresponding plurality of visible images, wherein generation of the plurality of synthetic images comprises an image processing algorithm configured to transform visible imagery to synthetic infra-red imagery, wherein generation of one or more synthetic infra-red images of the plurality of synthetic infra-red images comprises an addition of at least one hot spot to the one or more synthetic infra-red images, and wherein the plurality of visible images comprises image data of a switchgear, and wherein the output unit is configured to output information relating to the one or more anomalous hot spots.

2. The apparatus of claim 1, wherein generation of the plurality of synthetic images comprises utilisation of a trained image processing algorithm.

3. The apparatus of claim 2, wherein the trained image processing algorithm comprises a trained style transfer algorithm.

4. The apparatus of claim 1, wherein generation of two or more synthetic infra-red images of the plurality of synthetic infra-red images comprises an addition of the at least one hot spot to the two or more synthetic infra-red images.

5. The apparatus of claim 1, wherein addition of the at least one hot spot for at least one synthetic infra-red image is carried out manually.

6. The apparatus of claim 1, wherein addition of the at least one hot spot for at least one synthetic infra-red image is carried out automatically.

7. The apparatus of claim 6, wherein addition of the at least one hot spot comprises utilisation of an edge detection algorithm.

8. The apparatus of claim 1, wherein generation of the plurality of synthetic infra-red images comprises utilization of a hue algorithm.

9. The apparatus of claim 1, wherein generation of the plurality of synthetic infra-red images comprises utilization of a flood fill algorithm.

10. The apparatus of claim 1, wherein the plurality of visible images comprises image data of at least one circuit breaker.

11. The apparatus of claim 1, wherein the monitor infra-red image comprises image data of at least one circuit breaker.

12. The apparatus of claim 1, wherein the machine learning classifier algorithm comprises a neural network.

13. The apparatus of claim 12, wherein the neural network comprises a convolutional neural network.

14. The apparatus of claim 1, wherein the processing unit is configured to update a training of the machine learning classifier algorithm comprising utilisation of the monitor infra-red image as a training update.

15. The apparatus of claim 14, wherein the training update comprises a manual indication that the monitor infra-red image comprises no anomalous hot spots or a manual indication that the monitor infra-red image comprises one or more anomalous hot spots.

16. The apparatus of claim 15, wherein the manual indication that the monitor infra-red image comprises one or more anomalous hot spots comprises a manual indication of one or more locations in the monitor infra-red image of the one or more anomalous hot spots.

17. A system for monitoring a switchgear, the system comprising:
 an infra-red camera; and
 the apparatus of claim 1; and
 wherein the infra-red camera is configured to acquire the monitor infra-red image of the switchgear.

* * * * *